United States Patent
Schwager et al.

(10) Patent No.: US 12,483,658 B2
(45) Date of Patent: Nov. 25, 2025

(54) METHOD FOR DYNAMICALLY ADJUSTING A VOLUME LEVEL IN AN ONLINE MEETING

(71) Applicant: Dr. Ing. h.c. F. Porsche Aktiengesellschaft, Stuttgart (DE)

(72) Inventors: Robin Schwager, Leonberg (DE); Stefan Roos, Kieselbronn (DE); Lukas Ewecker, Stuttgart (DE); Tim Brühl, Höhr-Grenzhausen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 176 days.

(21) Appl. No.: 18/474,435

(22) Filed: Sep. 26, 2023

(65) Prior Publication Data
US 2024/0155058 A1   May 9, 2024

(30) Foreign Application Priority Data
Nov. 9, 2022   (DE) ............... 10 2022 129 541.9

(51) Int. Cl.
*H04M 3/56*   (2006.01)
*G06F 3/16*   (2006.01)

(52) U.S. Cl.
CPC ............ *H04M 3/568* (2013.01); *G06F 3/165* (2013.01)

(58) Field of Classification Search
CPC ...... H04M 3/568; H04M 3/566; H04M 3/569; H04M 3/4936; H04M 3/2218; H04M 3/56; H04M 15/41; H04M 3/436; H04M 15/00; G06F 3/165
See application file for complete search history.

(56) References Cited

U.S. PATENT DOCUMENTS

| | | | |
|---|---|---|---|
| 4,995,071 A * | 2/1991 | Weber | H04M 3/56 348/E7.083 |
| 9,357,075 B1 * | 5/2016 | Kloberdans | H04M 3/2236 |
| 10,581,625 B1 * | 3/2020 | Pandey | H04N 7/147 |
| 10,743,104 B1 * | 8/2020 | Weldemariam | G10L 21/003 |
| 2007/0206759 A1 | 9/2007 | Boyanovsky | |
| 2020/0160870 A1 * | 5/2020 | Baughman | G10L 15/30 |
| 2022/0103963 A1 | 3/2022 | Satongar et al. | |
| 2022/0236946 A1 * | 7/2022 | Khosrowpour | G06F 3/165 |
| 2022/0366904 A1 * | 11/2022 | Martinson | G10L 15/08 |

(Continued)

*Primary Examiner* — Akelaw Teshale
(74) *Attorney, Agent, or Firm* — Buchanan Ingersoll & Rooney PC

(57) ABSTRACT

A method for dynamically adjusting a volume level in an online meeting. The method includes step a. holding an online meeting in which participants can have a conversation with one another. In step b. using an AI algorithm, monitoring and recognizing content of a conversation of the participants in the online meeting and assigning content scores to the content, wherein each participant portion of the participants is assigned a recognized sub-content in the conversation based on the content scores. In step c. using the AI algorithm, recognizing a first intersection of content scores from a plurality of sub-contents, and recognizing a second or more intersections of content scores from other multiple sub-contents. In step d. adjusting volume levels of individual participants, by raising or lowering the volume level of a participant portion for such other participants having one or no intersection with the participant portion.

7 Claims, 2 Drawing Sheets

(56) References Cited

U.S. PATENT DOCUMENTS

2022/0399009 A1* 12/2022 Okada ................. G06F 16/9027
2023/0367543 A1* 11/2023 Robert Jose ............ G06F 3/167
2024/0114311 A1*  4/2024 Christman .............. H04S 7/304

* cited by examiner

METHOD FOR DYNAMICALLY ADJUSTING A VOLUME LEVEL IN AN ONLINE MEETING

CROSS-REFERENCE TO RELATED APPLICATION

This application claims priority to German Patent Application No. 10 2022 129 541.9, filed Nov. 9, 2022, the content of such application being incorporated by reference herein in its entirety.

FIELD OF THE INVENTION

The invention relates to a method for dynamically adjusting a volume level in an online meeting, a computer program having such a method, a computer program code, and a computer program product having such a computer program on which the computer program code is stored.

BACKGROUND OF THE INVENTION

When a large group of people meet for social activities (example scenario: at a table reserved for regular guests), there are usually several different conversations at the same table where different people participate. The human brain filters out the surrounding conversations and focuses on the conversation that it actively participates in. However, it is still possible to hear what other conversations are about and to switch the conversation group. By using certain phrases, gestures or loud voices, individuals or all persons present can also be made aware of a particular topic of discussion.

At least since the corona pandemic, some of the social contact for many people has shifted online via group calls. The regulars' table scenario described above is a very dynamic scenario, which, as things stand, cannot be recreated online. In online conversations, there is only one voice channel where, by default, all participants in an online meeting are heard equally loudly. For example, if four people are attending an online meeting, two people cannot talk about one topic while the other two are discussing another topic. At a real table, such a parallel conversation would be possible. In a group call, however, it is not, because the participants would always interrupt each other and the conversation channel can only be used by one person at a time.

SUMMARY OF THE INVENTION

On this basis, one aim of the present invention is to at least partially overcome the disadvantages known from the prior art. The features according to aspects of the invention follow from the independent claims, and advantageous configurations thereof are disclosed in the dependent claims. The features of the claims can be combined in any technically advantageous manner, wherein the explanations in the following description as well as features in the drawings, which include explanatory configurations of the invention, can also be used for this purpose.

The invention relates to a method for dynamically adjusting a volume level in an online meeting, comprising the steps of:

a. by means of a computer network with a plurality of user interfaces, holding an online meeting with a plurality of participants in which the participants can have a conversation with each other by means of a user interface;

b. using an AI algorithm, monitoring and recognizing content of a conversation of the participants in the online meeting and assigning content scores to the content, wherein each participant portion of the conversation is assigned a detected sub-content based on the content scores;

c. using the AI algorithm, recognizing a first intersection of content scores from a plurality of sub-content and recognizing a second or more intersections of content scores from another plurality of sub-content;

d. by means of a respective user interface, adjusting the volume level of individual participants, by means of:
  raising the volume level of a first participant portion of a first participant for those other participants who have a first intersection with the first participant portion, and/or
  decreasing the volume level of another participant portion of another participant for those participants who have a different intersection than the other participant portions.

Unless explicitly indicated otherwise, ordinal numbers used in the preceding and following description are for the sake of clear differentiation and do not reflect any order or ranking of the designated components. An ordinal number greater than one does not necessarily mean that a further such component need be present.

Using AI algorithms, for example, based on NLP (Natural Language Processing), it is possible to recognize topics of conversation. It is therefore possible to recognize the spoken content of each participant in the online meeting and assign it to the other participants with the same or similar conversational content. So, the AI algorithm is able to identify the individual participants in a larger group.

By adjusting the volume level individually via the respective user interface, the perceived part of the conversation is adjustable for each of the participants. Participants talking to each other would then hear the participants of their part of the conversation, for example, at a normal volume level (for example, set by the participant, usually perceived as pleasant), while other parts of the conversation are dampened, for example, reduced to zero, preferably shifted to such a low level that an increase in a real voice volume level of a participant whose part of the conversation is dampened, (approximately) the volume level for a normal (for example, subjectively average) voice volume is perceptible by the separate part of the conversation.

In step a., an online meeting is held via a computer network with a plurality of user interfaces. For example, it is only started at this time or is already set up. The online meeting involves a plurality of participants, namely a number greater than two, preferably at least four. It is not necessary for each of the participants to contribute a portion to a common conversation. Rather, it is also possible for a participant to behave passively in the conversation, for example as a pure listener. However, the following steps rely on a respective participant to respond to at least one participant portion of another participant in the conversation in the online meeting with a participant portion of their own. A participant portion is a monological speaking contribution, which can be assigned to a single participant. In this method, voice recognition is not necessarily required for this purpose. Preferably, the respective origin, which is clear from the real location and the data run, is taken as the basis. Alternatively or additionally, in the case of an ambiguous structure of the real location of the participants and user interfaces, voice recognition is used to assign a speech contribution as a participant portion to the respective associated participant, for example, if two or more participants share a microphone or even an entire user interface.

In one embodiment, a topic of a conversation in the held online meeting is already known to the AI algorithm in advance or by means of provided data, for example a title of the online meeting. The AI algorithm is then already able to recognize from the outset, whether or not there is an intersection with this topic. Alternatively, or additionally, the content of a first participant portion of a (first speaking) first participant is compared with a (temporal) second participant that contributes a second participant portion and an intersection of these is checked.

In step b., an AI algorithm is used to monitor and recognize the content of a conversation of the participants in the online meeting. Based on this, content scores are assigned to the content. For example, such content scores may be understood as keywording, wherein identical and/or similar keywords are compared in two different participant portions to one another. Furthermore, such a content score is preferably also configured as an indication of a whole group of keywords, so that a second participant portion, in which no keyword is identical or similar to a keyword of the first participant portion is nonetheless recognizable with a certain probability as a reaction to the first participant portion. For example, the first (or temporally preceding) participant portion could contain a connection as a keyword and the second (or temporal—not necessarily immediately following) participant portion could contain an attachment as a keyword. It should be noted that this is a highly simplified example and an AI algorithm, especially with NLP, can recognize the intersection of two interlocutors based on a myriad of conversations learned with astonishing accuracy.

In this process, it is important that each participant portion of the conversation is assigned a recognized sub-content based on the content scores. That is, a topic of a conversation is recognized and the participants involved are recognized. In one embodiment, no change in volume level is made to a passive participant. Alternatively, the basic assumption (default setting) in the method assumes that a passive participant follows the main conversation and participant portions that are assigned to another sub-content or another separate conversation group are reproduced to the passive participant in a dampened manner via his user interface.

In step c., a first intersection of content scores from a plurality of sub-contents, as well as a second or more intersections of content scores from another plurality of sub-contents is generated using the AI algorithm. Thus, only when at least two different intersections emerge is a division into groups made, for example into a common conversation group as a basic assumption for all participants and into a (first) separate conversation group for participants who talk about a divergent topic. It should be noted that an intersection is also recognized with other available data, for example, as mentioned above, the title of the online meeting or a description in an invitation to this online meeting.

In step d., based on the intersections recognized in step c., the volume level of individual participants is adjusted by means of a respective user interface. In one embodiment, each participant from whom the sub-content has not yet been recognized is first reproduced at normal volume to the other participants via their user interface. Alternatively, conversely, each participant is initially reproduced in a dampened manner until his sub-content has been recognized. However, once the sub-content has been recognized, it is compared with other sub-content or other available data and thus the volume level is adjusted.

In one embodiment, the volume level of a first participant portion of a first participant is raised for such other participants having a first intersection with the first participant portion, which starts from a normal volume level or from a muted volume level. In one embodiment, the volume level is raised only relative to the other participant portions, that is to say, the other participant portions are dampened.

In one embodiment, the volume level of another participant portion of another participant is lowered, i.e., dampened or even muted, for those participants who have a different intersection than the other participant portions. In one embodiment, the volume level is lowered only relative to the other participant portions, that is to say, the other participant portions are controlled more loudly.

How this is switched is, for example, individually set by a participant on their user interface or an algorithm controlling its user interface (for example, the AI algorithm that works here in step b. and/or c.). Alternatively or additionally, this is controlled by a controller depending on the situation, for example the AI algorithm mentioned.

With this algorithm, online conversations could be made much more realistic.

It is further proposed in an advantageous embodiment of the method that in step d. when the volume level is lowered, the conversational content of the participant portions in question is still comprehensible by a participant, preferably perceived as a low interference.

In this embodiment, the respective participant is still able to follow a different participant portion (i.e., a different conversation than their own). This is possible, for example with concentrated listening, or listening alongside. The respective participant can determine this for himself personally as a fixed setting depending on the individual (for example, when a superior speaks, to reproduce this louder than when a participant of the same order speaks). In one embodiment, it is also dynamically and/or readily controlled, for example by clicking on certain participants on a graphical user interface or by means of an AI algorithm (for example, the one mentioned herein) that recognizes the relevance for a participant. The relevance is known, for example, by means of metadata of the respective participant, for example including their position in the company, his areas of interest or areas of responsibility.

This emulates the regulars' table scenario when each participant clearly understands their current conversation partners but can still listen in on other conversations. So dynamically adjusting the conversation volume level is used when people change their topic of conversation (sub-content) to that of other conversations (in the common conversation group).

It is further proposed in an advantageous embodiment of the method that the adjustment of the volume level in step d. of the respective user interface is predetermined by the AI algorithm assigning the content scores and recognizing intersections.

In this embodiment, controlling the volume level is also the task of the AI algorithm, which not only assigns the conversation groups, but also decides how exactly the volume level is changed. In one embodiment, there is a fixed setting of all participants, in one embodiment, at least one participant has an individual setting, for example due to hearing impairment, which may also dynamically react to different types of sounds (and in particular speech). Such settings are overridden, or if necessary, replaced by the control of the AI algorithm. For example, a participant may have turned up the volume level of a participant who is his supervisor or another important person. However, if this participant is pulled into a separate conversation group, this setting is either overwritten or dampened with the same factor or more (for example, to almost the same level as the other participants outside his current separate conversation group). For example, a presentation (e.g., automatically played) in the online meeting could be prioritized by the participants in terms of volume (e.g., also as an external default). Then, in a separate conversation group, for example, when there is a slide change or a topic change (content scores) in the presentation detected by the AI algorithm (i.e., the content scores in the common conversation group in which the presentation is held or classified), the volume level thereof would be raised at least briefly relative to the volume level in a separate conversation group. This allows participants to follow the presentation similarly to a focused participant and see if they need to pay attention or not. In one advantageous embodiment, the volume level of such a presentation depends on the metadata (for example, as already mentioned above) of an individual participant or a group of participants to influence their decision whether to adjust the volume level.

It is further proposed in an advantageous embodiment of the method that by means of the AI algorithm, monitoring and recognition of command words, wherein at least one command word is predefined for at least one of the following actions:
  i. adding at least one participant to a separate conversation group from a common conversation group of all participants, wherein preferably the separate conversation group has been configured by adjusting the volume level according to step d.;
  ii. separating a conversation group of participants from a common conversation group of all participants, preferably by adjusting the volume level according to step d.;
  iii. ending a separate conversation group, wherein preferably the separate conversation group has been configured by adjusting the level volume according to step d.;
  iv. collecting all participants in a common conversation group; and
  v. opening a separate conversation group.

In this embodiment, additional fixed or intelligent (for example syntax-based) command words can be recognized by the AI algorithm. Based on such a command word, an action is triggered, for example, as indicated above. In one embodiment, there are fixed or intelligent command words such as "Hey", "Listen to me" or, for example, naming one of the participants (and also nicknames, if applicable). Thus, for example, the attention of certain or all participants can be drawn to the participant saying the command word or its sub-content by adjusting the volume level of its sub-content. This sub-content is then perceived loudly or louder, for example, across groups or (if specific to the participant) independently of the current group membership by the respective participant or (for example, all) participants.

In case i., for example, the name of a particular participant or his division or department is mentioned. Thus, the respective participant is immediately drawn into the separate conversation group (i.e., the conversations in it, i.e., the sub-content of the participants involved are reproduced relatively louder to him) or he only receives an invitation to join by having the sub-content concerned (and possibly at least another subsequent sub-content) reproduced back to him relatively louder for a short time following such a command word. In the latter case, the participant to be added joins the respective separate conversation group by responding or saying an adequate command word, or by denying this invitation by means of an adequate command word or other action (for example, clicking and closing an accompanying pop-up on their graphical user interface) or by the absence of a response in their own sub-content that can be recognized by the AI algorithm or by the silence of the participant concerned.

For example, in case ii. a department or topic is mentioned. This draws a group of participants (for example, via their metadata or their responses as speech or clicks) directly into the separate conversation group (i.e., the conversations therein, i.e., the sub-content of the participants involved are reproduced relatively louder to them) or they only receive an invitation to join this new or pre-existing separate conversation group by having the relevant sub-content and, if applicable, at least another subsequent sub-content reproduced to them relatively louder for a short time following such a command word. For example, in the latter case, the decision as to whether a participant joins the separate conversation group is controlled as listed above with respect to case i.

In case iii., a separate conversation group is terminated on a command word, whereby this also depends on the position of the speaking participant. In one embodiment, this needs to be expressed by a participant of the current separate conversation group. In one embodiment, a separate conversation group, which is preferably perceptible (i.e., audible and, if applicable, understandable in terms of content) for the participants outside of this separate conversation group, can be closed by uttering a command word by a participant who does not participate in this separate conversation group. In a preferred embodiment, the command words of the aforementioned sub-cases iii. are different from one another.

In case iv. a common conversation group is started, for example in interaction with case iii. Here too, the collection is algorithmically fixed, i.e., inevitable for the participants (at least in the short term), or merely an invitation, as already explained above with regard to the other cases.

In case v., in addition to or independently of the sub-contents, a separate conversation group is opened on a corresponding command word, again algorithmically fixed or merely as an invitation.

It should be noted that these cases mentioned are not to be understood as a final list.

It is further proposed in an advantageous embodiment of the method, that a visual representation of at least one of the other participants is displayed via at least one of the user interfaces,
  wherein, analogously to step d., when the volume level of a first participant portion of a first participant is raised for such other participants that have a first intersection with the first participant portion, the visual representation of the first participant is highlighted and/or wherein, analogously to step d., when the volume level of another participant portion of another participant is lowered for such participants which have an intersection which differs from the other participant portions, the visual representation of the other participants is reduced or hidden.

In this embodiment, the currently common visual representation, for example a virtual and/or holographic representation of a participant or a live video display, is also changed when a (separate) conversation group is opened. In a simple embodiment, only the participants of the respective (separate) conversation group are shown to each other and the other participants are hidden. In one embodiment, the size is changed accordingly. In one embodiment, a presentation currently displayed is moved to a sub-screen or a secondary screen. In one embodiment, the color representation and/or brightness is changed. In one embodiment, a larger portion of the body of the respective participant (presented virtual or live) is displayed, for example, always the one who is currently speaking or all participants of a respective (separate) conversation group. Conversely, for example, a presenter in the common conversation group is reduced, displayed in a smaller size, for the participants who have found themselves in a separate conversation group.

It should be noted, in one embodiment with a graphical user interface, that the decisions of the AI algorithm or the user interface based on this method are accompanied, for example, by pop-ups, which provide the relevant participants with the option to respond non-verbally (for example, by clicking or not reacting) to these decisions.

According to a further aspect, a computer program comprising a computer program code is proposed, wherein the computer program code can be executed on at least one computer such that the at least one computer is caused to execute the method according to an embodiment as described above within a computer network using a user interface, wherein at least one of the computers:
is integrated into a local computer; and/or
is configured to communicate with a cloud.

Accordingly, a computer comprises one or more processors, for example a general purpose processor (CPU) or microprocessor, RISC processor, GPU, and/or DSP. For example, the computer comprises additional elements such as memory interfaces. Optionally or additionally, the terms refer to such a device that is capable of executing a provided or integrated program, preferably with standardized programming language (e.g., C++, JavaScript, or Python), and/or controlling and/or accessing data memory devices and/or other devices, such as input interfaces and output interfaces. The term "computer" also refers to a plurality of processors or a plurality of (sub)computers that are interconnected and/or otherwise communicatively connected and possibly jointly use one or more other resources, such as a memory.

A (data) memory is, for example, a hard drive (HDD, SSD, HHD) or a (non-volatile) solid-state memory, for example a ROM memory or flash memory [Flash EEPROM]. The memory often comprises a plurality of separate physical units or is distributed to a plurality of separate devices so that access thereto takes place via (data) communication, for example package data service. The latter is a decentralized solution, wherein memories and processors of a plurality of separate computer units are used instead of a (single) central on-board computer or in addition to a central server.

In one embodiment, the computer program can be partially or entirely executed on a server or server unit of a cloud system, a handheld device (e.g., a smartphone), and/or on at least one unit of the computer. The term "server" or "server unit" refers herein to such a computer that provides data and/or operational services or services for one or more other computer-aided devices or computers, thus forming the cloud system.

According to a further aspect, a computer program product is proposed on which the computer program code is stored, wherein the computer program code can be executed on at least one computer such that the at least one computer is caused to execute the method according to an embodiment as described above within a computer network using a user interface, wherein at least one of the computers:
is integrated into a local computer; and/or
is configured to communicate with a cloud.

A computer program product comprising the computer program code is, for example, a medium, such as RAM, ROM, SD card, memory card, flash memory card or disk. Alternatively, a computer program product is stored on a server and can be downloaded. Once the computer program is rendered readable via a readout unit, (for example a drive, and/or installation), the computer program code and the method contained therein can be executed by a computer or in communication with a plurality of computer-assisted devices, for example according to the above description.

BRIEF DESCRIPTION OF THE DRAWINGS

The invention described above is explained in detail below with reference to the accompanying drawings, which illustrate preferred configurations in the context of the relevant technical background. The invention is in no way limited by the purely schematic drawings, wherein it is noted that the drawings are not drawn to scale and are not suitable for defining proportions.

DETAILED DESCRIPTION OF THE INVENTION

Figure 1:
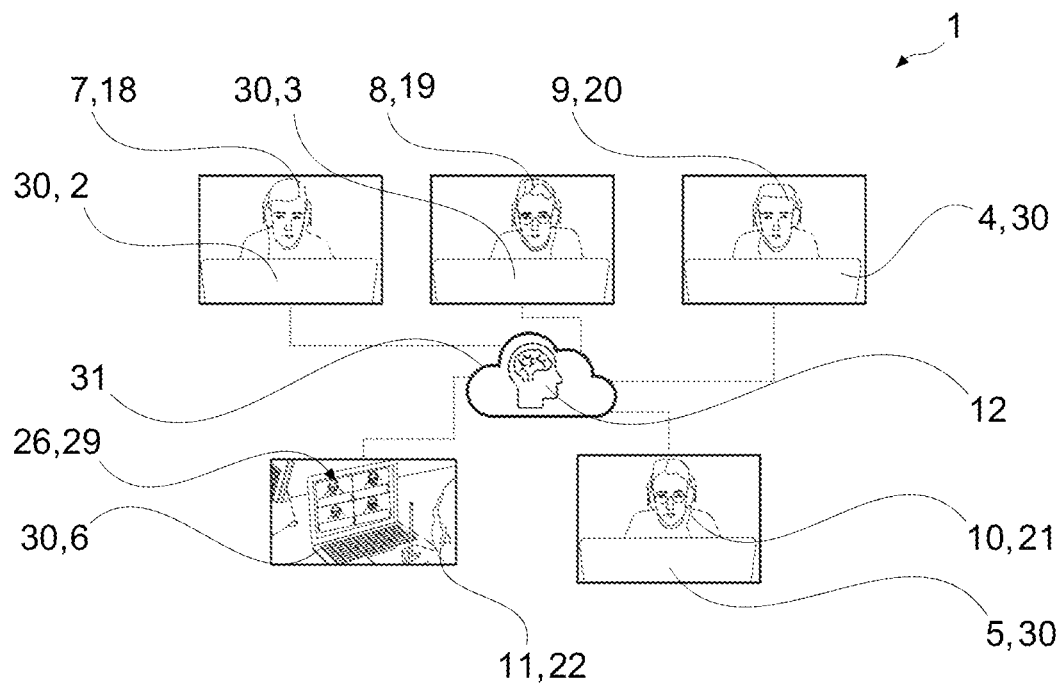
FIG. 1 depicts a computer network having a plurality of participants.

In FIG. 1, a computer network 1 with a plurality of participants 7,8,9,10,11 is shown in a schematic representation. In this embodiment, a first participant 7, a second participant 8, a third participant 9, a fourth participant 10, and a fifth participant 11 are shown in an online meeting within a computer network 1. Each participant 7,8,9,10,11 speaks (or can speak) and then each delivers sub-content 18,19,20,21,22 to the computer network 1. The participants 7,8,9,10,11 each interact with a user interface 2,3,4,5,6, which is configured here as a computer 30 (purely optionally) along with an audio playback unit and audio-recording unit, and also equipped with a visual playback unit (preferably for reproducing a visual representation 29 of at least one of the other participants 11,10,9,8,7). In the embodiment shown, the user interfaces 2,3,4,5,6, are connected to each other with an AI algorithm 12 by means of a cloud 31.

Figure 2:
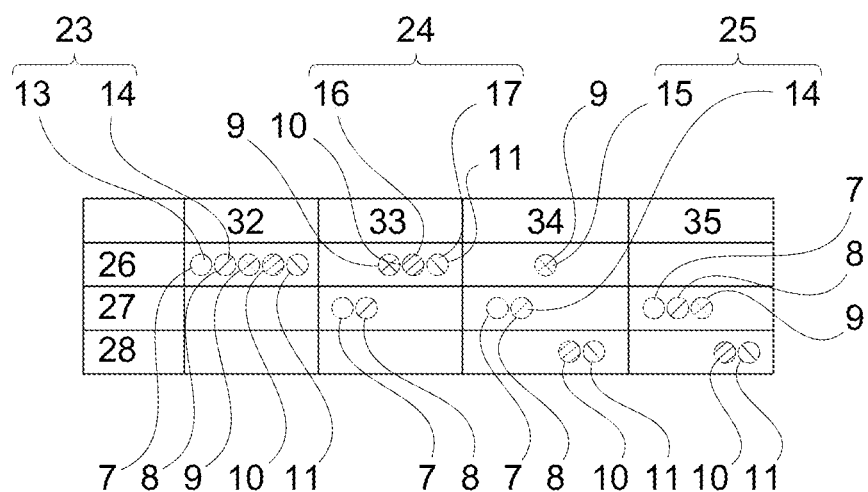
FIG. 2 depicts a schematic event diagram of an online meeting organized by an AI algorithm.

The AI algorithm 12 assigns a content score to each sub-content 18,19,20,21,22 by means of the method and thus makes intersections 23,24,25 (compare with FIG. 2). By means of the intersections 23,24, conversation groups 26,27,28 are then created within the online meeting. For the (for example, second) participant 8 belonging to the respective (for example, first) separate conversation group 27, the (first) participant 7 belonging to this (first) separate conversation group 27 or their (first) participant portion 13 is highlighted by means of the (correspondingly, for example, second) user interface 3. With regard to the language, i.e., the (first) participant portion 13, this is achieved by increasing the volume level for the other (second) user 8 within the relevant (first) separate conversation group 27 and/or by reducing the volume level of the participant portions 15,16, 17 in the common conversation group 26 and, if necessary, the second separate conversation group 28.

In FIG. 2, a schematic simplified event diagram of an online meeting organized by an AI algorithm 12 is shown. The AI algorithm 12, for example, based on NLP (Natural Language Processing), is able to recognize topics of conversation in the participant portions 13,14,15,16,17 of the participants 7,8,9,10,11 of the online meeting. It is therefore possible to recognize the spoken content of each participant 7,8,9,10,11 of the online meeting, to distribute person-related (i.e., participant-related) content scores and to assign them to the other participants 11,10,9,8,7 with a same or similar conversational content, i.e., an intersection 23,24,25 of the content scores.

In this diagram, at the time of a first event 32 (for example, a welcome at the start of the online meeting), all participants 7,8,9,10,11 with their respective participant portion 13,14,15,16,17 belong to a common conversation group 26. Over the course of the online meeting, which is shown in the table in this exemplary embodiment from left to right, common intersections 23 of the content scores of the participant portions 13,14,15,16,17 arise among the participants 7,8, which are then broken up into a separate conversation group 27,28.

For example, at the first event 32, the first participant 7 talks about a topic (first participant portion 13), which may deviate from the set topic for the common conversation group 26. The second participant 8 responds with their (second) participant portion 14, whereby the AI algorithm 12 recognizes an intersection of the respective content scores of the two participant portions 13,14. Thus, these two participants 7,8 are automatically moved to a first separate conversation group 27, at least by means of the above-described adjustment of the volume levels of the respective participant portions 13,14,15,16,17.

For example, at the second event 33, the fourth participant 10 talks about a topic (fourth participant portion 16), which may deviate from the set topic for the common conversation group 26 and also from the current topic in the first separate conversation group 27. The fifth participant 11 responds with their (fifth) participant portion 17, whereby the AI algorithm 12 recognizes an intersection of the respective content scores of the two participant portions 16,17. These two participants 7,8 are thus automatically (simplified here at the time of the following event 34) moved to another, i.e., second separate conversation group 28, at least by means of the previously described adjustment of the volume levels of the respective participant portions 13,14,15,16,17.

For example, at the third event 34, the third participant 9 talks about a topic (third participant portion 15), which may have a third intersection 25 (which may deviate from the initial first intersection 23) with the current topic in the first separate conversation group 27. The third participant 9 is then automatically moved to the first separate conversation group 27 at least by means of the previously described adjustment of the volume levels of the respective participant portions 13,14,15,16,17 because the AI algorithm 12 recognized this intersection 25 with the participant portions 13,14 in the first separate conversation group 27.

It should be noted that the adjustment of the volume levels for the mentioned events 32,33,34 relates to each of the participants 7,8,9,10,11. It should be noted that an event 32,33,34,35 can be considered a period of time in which recognition by means of the AI algorithm 12 finally took place and thereupon a partitioning into separate conversation groups 27,28 takes place. Alternatively, such a distribution into conversation groups 26,27,28 already takes place during recognition, whereby this is then carried out gradually, for example, and/or is accompanied by a graphical display by means of which a participant 7,8,9,10,11 can also reject the suggestion of the AI algorithm 12 or can also join a conversation group 26,27,28 (at the time of opening or also at a later point in time) without their own speaking components.

In an alternative embodiment, at the time of the third event 34 of (for example, the second) participant 8 of the first separate conversation group 27, the third participant 9 is added to the first separate conversation group 27 by means of a command word, for example by stating the name of the third participant 9 or their department.

According to one aspect of the online meeting, only the visual representation 29 of those participants 7,8,9,10,11 of the own current conversation group 26 is displayed to the participants 7,8,9,10,11 in the respective conversation group 26,27,28.

Figure 3:
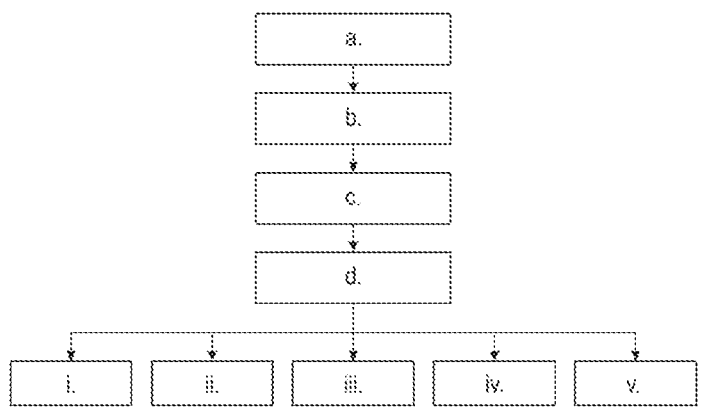
FIG. 3 depicts a flow chart of the method for dynamically adjusting a volume level in an online meeting.

FIG. 3 shows a flow chart of the method for dynamically adjusting a volume level in an online meeting. In step a., an online meeting is held via a computer network 1 with a plurality of user interfaces 2,3,4,5,6, for example, it is only started at this point in time or is already set up.

In step b., an AI algorithm 12 is used to monitor and recognize the content of a conversation of the participants 7,8,9,10,11 in the online meeting. Based on this, content scores are assigned to the content.

In step c., by means of the AI algorithm 12, a first intersection 23 of content scores of a plurality of sub-contents 18,19, as well as a second or more intersections 24,25 of content scores of other plurality of sub-contents 20,21,22, is obtained. Thus, only when at least two different intersections 23,24,25 are found is a division into groups made, for example into a common conversation group 26 as a basic assumption for all participants and into a (first) separate conversation group 27 for participants 7,8 who discuss a different topic.

In step d., based on the intersections 23,24 recognized in step c., the volume level of individual participants 7,9,10,11 is adjusted by means of a respective user interface 2,3,4,5,6. In this exemplary embodiment, each participant 7,8,9,10,11 from whom the sub-content 18,19,20,21,22 has not yet been recognized is first reproduced at normal volume to the other participants 8,9,10,11 via their user interface 3,4,5,6.

In this case i. for example, the name of a particular participant 9 or their division or department is mentioned. Thus, the respective participant 9 is immediately drawn into the separate conversation group 27 or only receives an invitation by reproducing the respective sub-content 18 relatively louder for a short time following such a command word.

For example, in case ii. a department or topic is mentioned. This draws a group of participants 10,11 (for example, via their metadata or their responses as speech or clicks) directly into the separate conversation group 28 or they only receive an invitation to join this new or pre-existing separate conversation group 28 by having the relevant sub-content 21 and, if applicable+, at least another subsequent sub-content 22 reproduced to them relatively louder for a short time following such a command word.

In case iii., a command word, for example, which also depends on the position of the speaking participant, is terminated by a (separate) conversation group 27.

In case iv. a common conversation group 26 is started, for example in interaction with case iii.

In case v., in addition to or independently of the sub-contents 18,19,20,21,22, a separate conversation group 28 is opened on a corresponding command word, again algorithmically fixed or merely as an invitation.

The method proposed here for dynamically adjusting a volume enables a group conversation in an online meeting that is perceived as natural.

LIST OF REFERENCE NUMERALS

1 Computer network
2 First user interface
3 Second user interface
4 Third user interface
5 Fourth user interface
6 Fifth user interface
7 First participant
8 Second participant
9 Third participant
10 Fourth participant
11 Fifth participant
12 AI algorithm
13 First participant portion
14 Second participant portion
15 Third participant portion
16 Fourth participant portion
17 Fifth participant portion
18 First sub-content
19 Second sub-content
20 Third sub-content
21 Fourth sub-content
22 Fifth sub-content
23 First intersection
24 Second intersection
25 Third intersection
26 Common conversation group
27 First separate conversation group
28 Second separate conversation group
29 Visual representation
30 Computer
31 Cloud
32 First event

What is claimed is:

1. A method for dynamically adjusting a volume level in an online meeting, said method comprising the steps of:
   a. by way of a computer network with a plurality of user interfaces, holding an online meeting with a plurality of participants, in which the participants can have a conversation with each other by way of a respective user interface;
   b. using an AI algorithm, monitoring and recognizing content of a conversation of the participants in the online meeting and assigning content scores to the content, wherein each participant portion of the participants is assigned a recognized sub-content in the conversation based on the content scores;
   c. using the AI algorithm, recognizing a first intersection of content scores from a plurality of sub-contents, and recognizing a second or more intersections of content scores from other multiple sub-contents;
   d. using the AI algorithm, establishing groupings of participants based on the first and second or more intersections of content scores; and
   e. by way of a respective user interface, adjusting volume levels of individual participants at each user interface based on the established groupings, by means of:
      (i) raising the volume level of a first participant portion of a first participant at the user interface for such other participants having a first intersection with the first participant portion and/or
      (ii) lowering the volume of another participant portion of another participant at the user interface for such participants having a different intersection from the other participant portions.

2. The method according to claim 1, wherein in step e. when the volume level is lowered, a conversational content of the respective participant portions is still comprehensible by a participant and perceived as low interference.

3. The method according to claim 1, wherein adjusting the volume level in step e. of the respective user interface is predetermined by the AI algorithm assigning the content scores and recognizing intersections.

4. The method according to claim 1, wherein using the AI algorithm, monitoring and recognizing command words, wherein at least one command word is predefined for at least one of the following actions:
   i. adding at least one participant to a separate conversation group from a common conversation group of all participants, wherein the separate conversation group has been established by adjusting the volume level according to step e.;
   ii. separating a conversation group of participants from a common conversation group of all participants by adjusting the volume level according to step e.;
   iii. ending a separate conversation group, wherein the separate conversation group has been established by adjusting the volume level according to step e.;
   iv. collecting all participants in a common conversation group; and
   V. opening a separate conversation group.

5. The method according to claim 1, wherein via at least one of the user interfaces, a visual representation of at least one of the other participants is displayed,
   wherein, analogously to step e., when increasing the volume level of a first participant portion of a first participant for such other participants having a first intersection with the first participant portion, the visual representation of the first participant is highlighted, and/or
   wherein, analogously to step e., when the volume level of another participant portion of another participant is reduced for such participants, which have an intersection deviating from the other participant portions, the visual representation of the other participants is reduced or hidden.

6. A non-transitory computer program comprising a computer program code, wherein the computer program code, executable on at least one computer such that the at least one computer, which is integrated into a local computer and/or configured to communicate with a cloud, is configured to perform the following steps within a computer network using a user interface:
   a. by way of a computer network with a plurality of user interfaces, hold an online meeting with a plurality of participants, in which the participants can have a conversation with each other by way of a respective user interface;
   b. using an AI algorithm, monitor and recognize content of a conversation of the participants in the online meeting and assigning content scores to the content, wherein each participant portion of the participants is assigned a recognized sub-content in the conversation based on the content scores;
   c. using the AI algorithm, recognize a first intersection of content scores from a plurality of sub-contents, and recognizing a second or more intersections of content scores from other multiple sub-contents;

d. using the AI algorithm, establish groupings of participants based on the first and second or more intersections of content scores; and e. by way of a respective user interface, adjust volume levels of individual participants at each user interface based on the established groupings, by means of:
   (i) raising the volume level of a first participant portion of a first participant at the user interface for such other participants having a first intersection with the first participant portion and/or
   (ii) lowering the volume of another participant portion of another participant at the user interface for such participants having a different intersection from the other participant portions.

7. A non-transitory computer program product on which a computer program code is stored, wherein the computer program code can be executed on at least one computer, wherein the at least one computer is integrated into a local computer and/or is configured to communicate with a cloud, said at least one computer being configured to perform the following steps:

a. by way of a computer network with a plurality of user interfaces, hold an online meeting with a plurality of participants, in which the participants can have a conversation with each other by way of a respective user interface;

b. using an AI algorithm, monitor and recognize content of a conversation of the participants in the online meeting and assigning content scores to the content, wherein each participant portion of the participants is assigned a recognized sub-content in the conversation based on the content scores;

c. using the AI algorithm, recognize a first intersection of content scores from a plurality of sub-contents, and recognizing a second or more intersections of content scores from other multiple sub-contents;

d. using the AI algorithm, establish groupings of participants based on the first and second or more intersections of content scores; and e. by way of a respective user interface, adjust volume levels of individual participants at each user interface based on the established groupings, by means of:
   (i) raising the volume level of a first participant portion of a first participant at the user interface for such other participants having a first intersection with the first participant portion and/or
   (ii) lowering the volume of another participant portion of another participant at the user interface for such participants having a different intersection from the other participant portions.

* * * * *